US007645407B2

(12) United States Patent
Cade et al.

(10) Patent No.: US 7,645,407 B2
(45) Date of Patent: Jan. 12, 2010

(54) METHOD OF SEALING A HARD SHELL CAPSULE

(75) Inventors: Dominique Nicolas Cade, Colmar (FR); Frederic Hoehn, Eschentzwiller (FR); Philippe Charles Peter, Urschenheim (FR); Robert Anthony Scott, Sint-Niklaas (BE)

(73) Assignee: Warner-Lambert Company LLC, New York, NY (US)

( * ) Notice: Subject to any disclaimer, the term of this patent is extended or adjusted under 35 U.S.C. 154(b) by 470 days.

(21) Appl. No.: 10/795,898

(22) Filed: Mar. 8, 2004

(65) Prior Publication Data

US 2005/0110192 A1 May 26, 2005

(30) Foreign Application Priority Data

Mar. 21, 2003 (EP) .................................. 03290723

(51) Int. Cl.
*B29C 45/14* (2006.01)
*B29C 70/84* (2006.01)

(52) U.S. Cl. ......................... 264/263; 264/39; 264/161; 264/275

(58) Field of Classification Search ....................... None
See application file for complete search history.

(56) References Cited

U.S. PATENT DOCUMENTS 3,025,652 A 3/1962 Ellsworth
3,073,087 A * 1/1963 Saudhage et al. ............. 53/485
3,847,694 A * 11/1974 Stewing ........................ 156/86
4,155,478 A * 5/1979 Ogi ........................... 220/4.21
4,196,565 A * 4/1980 Bodenmann et al. .......... 53/471
4,235,832 A * 11/1980 Leighton .................... 264/230
4,261,947 A * 4/1981 Ogi ............................ 264/263
4,415,387 A * 11/1983 Newman ..................... 156/69
4,628,850 A * 12/1986 Day et al. ................... 114/219
4,940,499 A * 7/1990 Lebrun et al. ................. 156/69
2001/0019055 A1* 9/2001 Gaster ....................... 220/4.21

FOREIGN PATENT DOCUMENTS

DE 3246392 6/1984
EP 0110603 11/1983
EP A1 0116743 8/1984
EP A1 0116744 8/1984
EP A1 0180543 5/1986
EP A1 1072245 1/2001

* cited by examiner

*Primary Examiner*—Edmund H. Lee
(74) *Attorney, Agent, or Firm*—Gregg C. Benson; Garth Butterfield; Mary J. Hosley

(57) ABSTRACT

A method is disclosed for the sealing of hard shell capsules having coaxial body parts which overlap when telescopically joined. Also described is an apparatus to seal the capsules. The method comprises the steps of holding the capsule in a precise and upright position and injecting a quantity of sealing fluid in the overlap of the body parts. An apparatus for performing the method is also disclosed. The apparatus comprises a sealing clamp to hold the capsule in an upright position and means to inject the sealing fluid in the overlap of the body parts.

4 Claims, 7 Drawing Sheets

Fig. 1
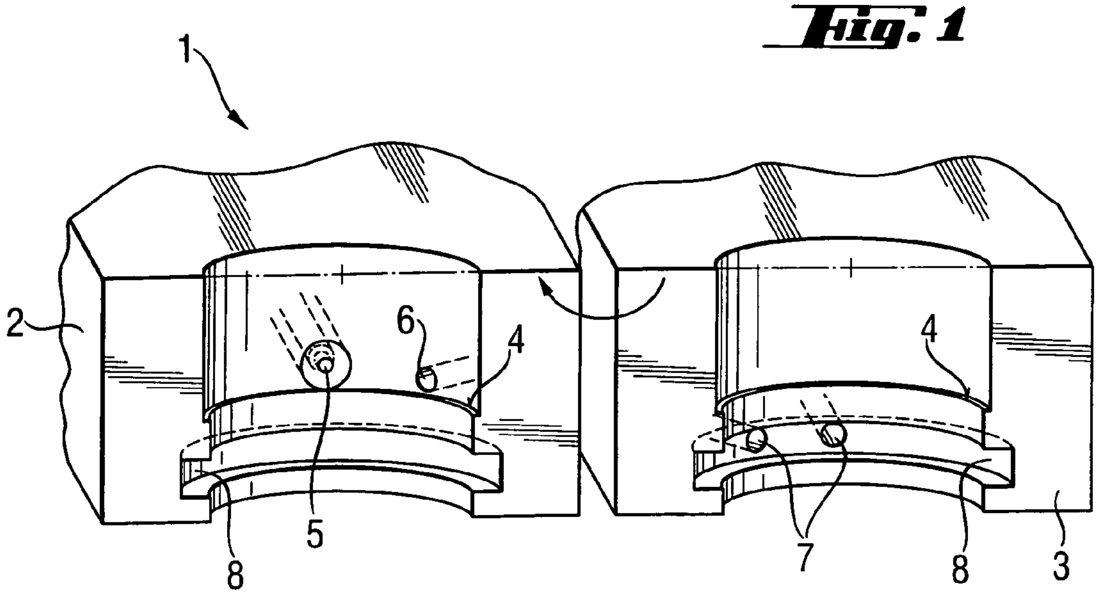
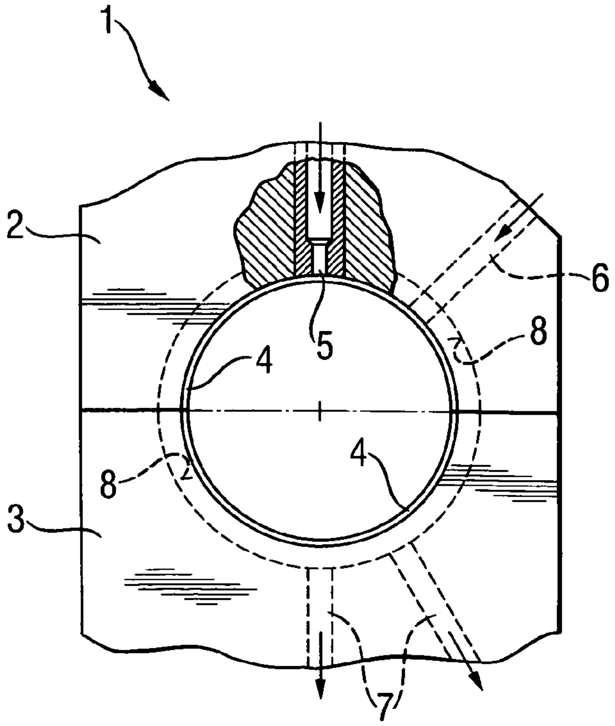
Fig. 2

Fig. 5
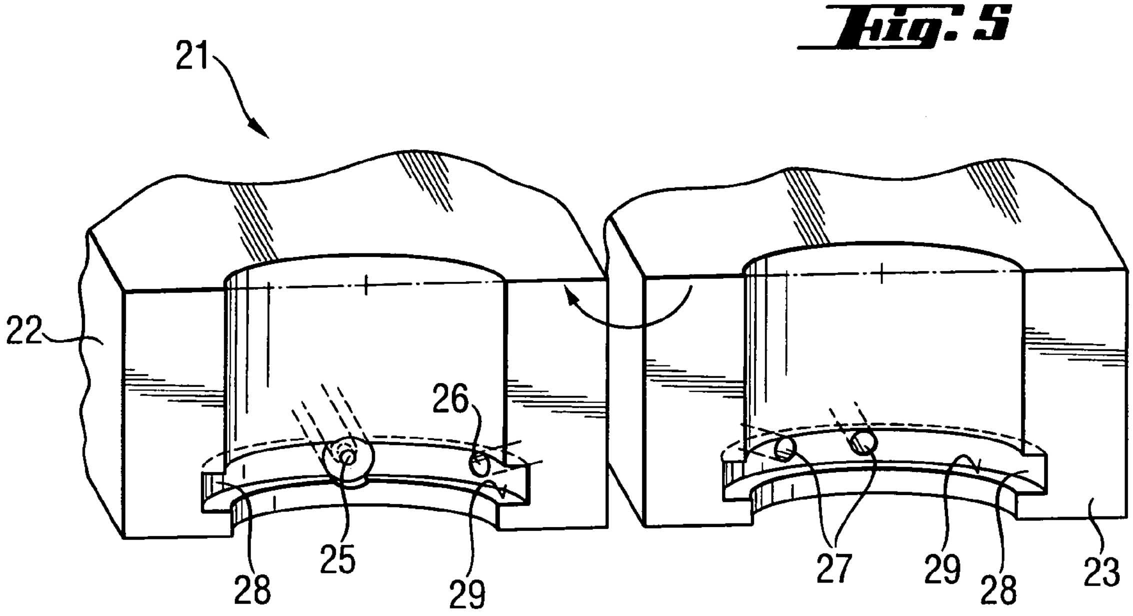
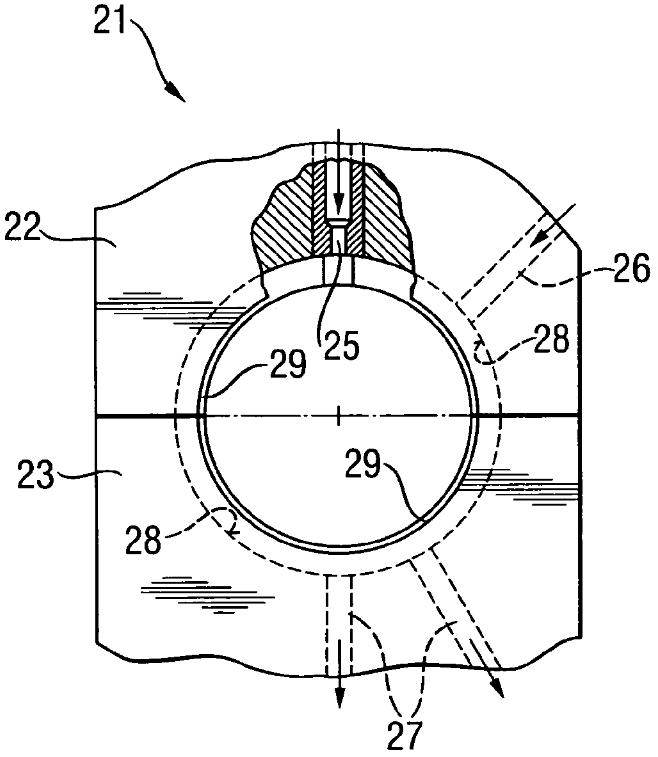
Fig. 6

*Fig. 7*
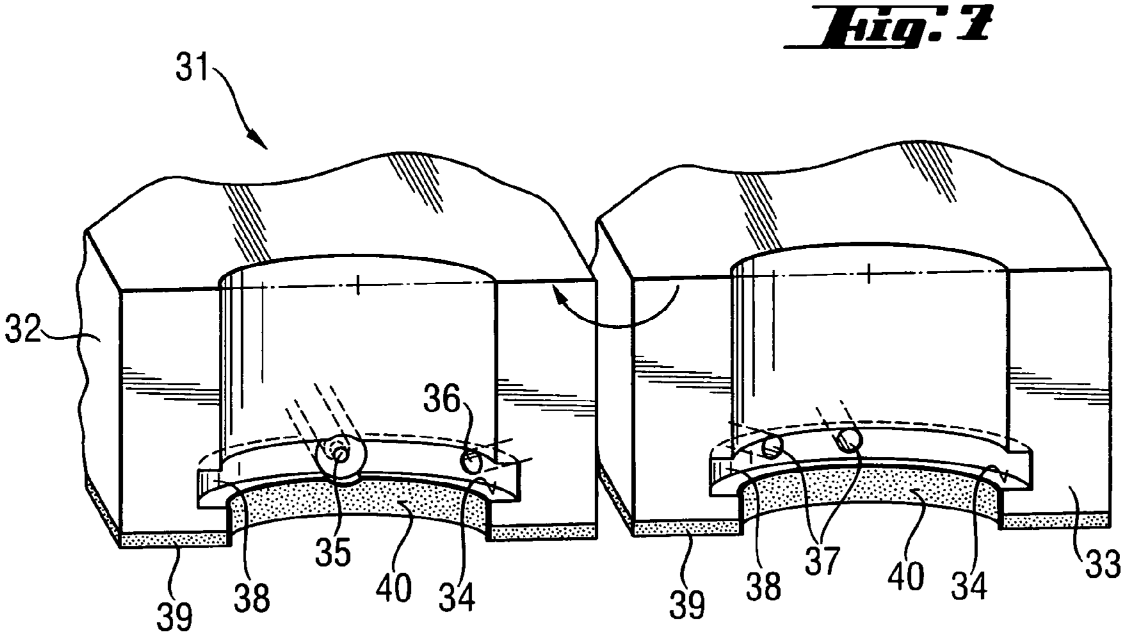
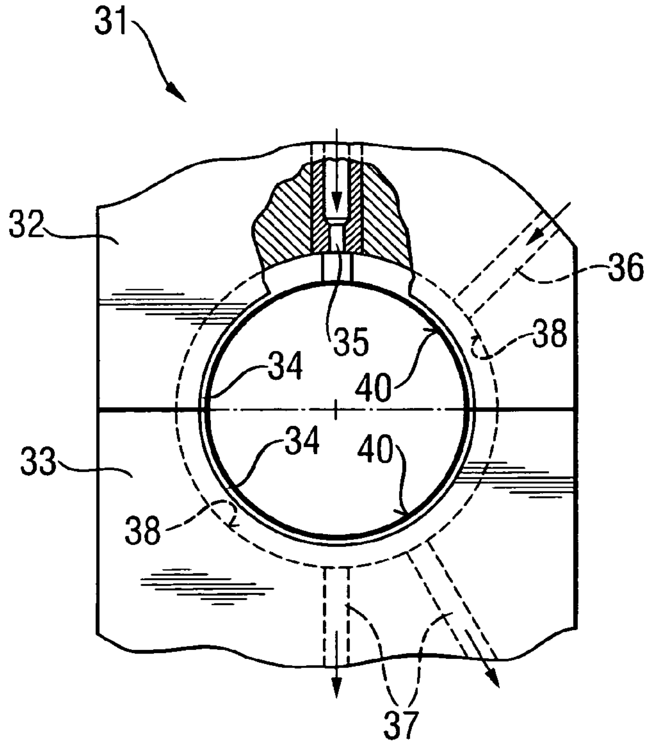
*Fig. 8*

Fig. 11
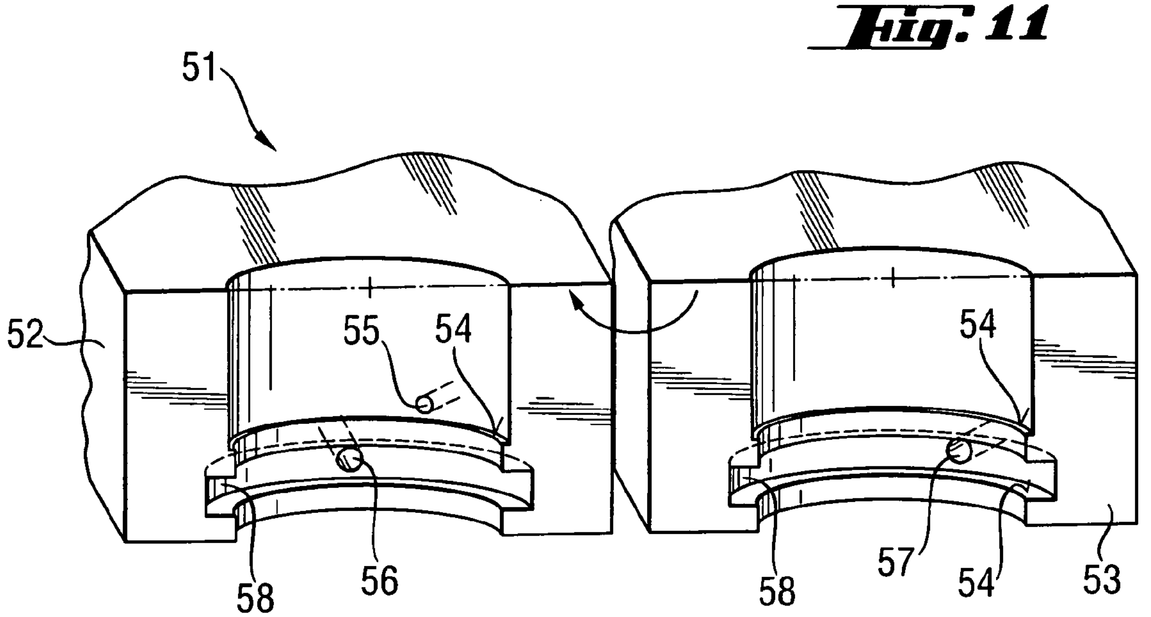
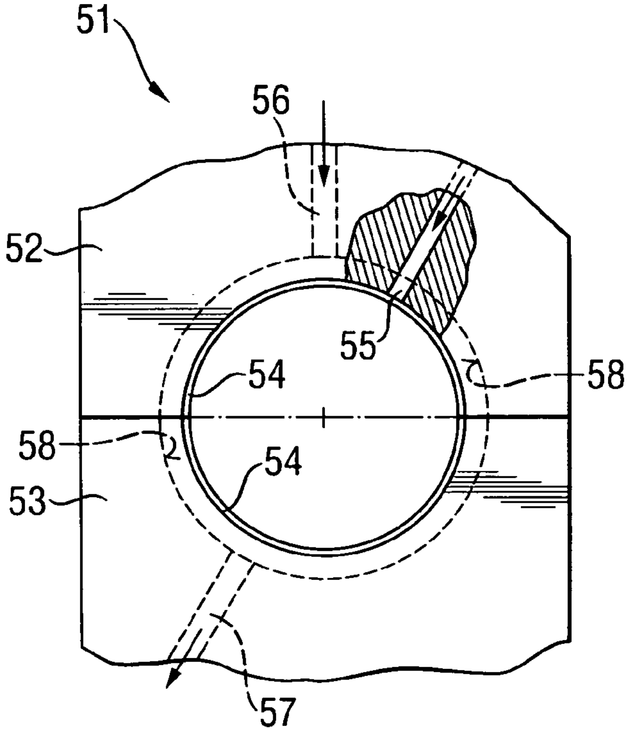
Fig. 12

Fig. 13
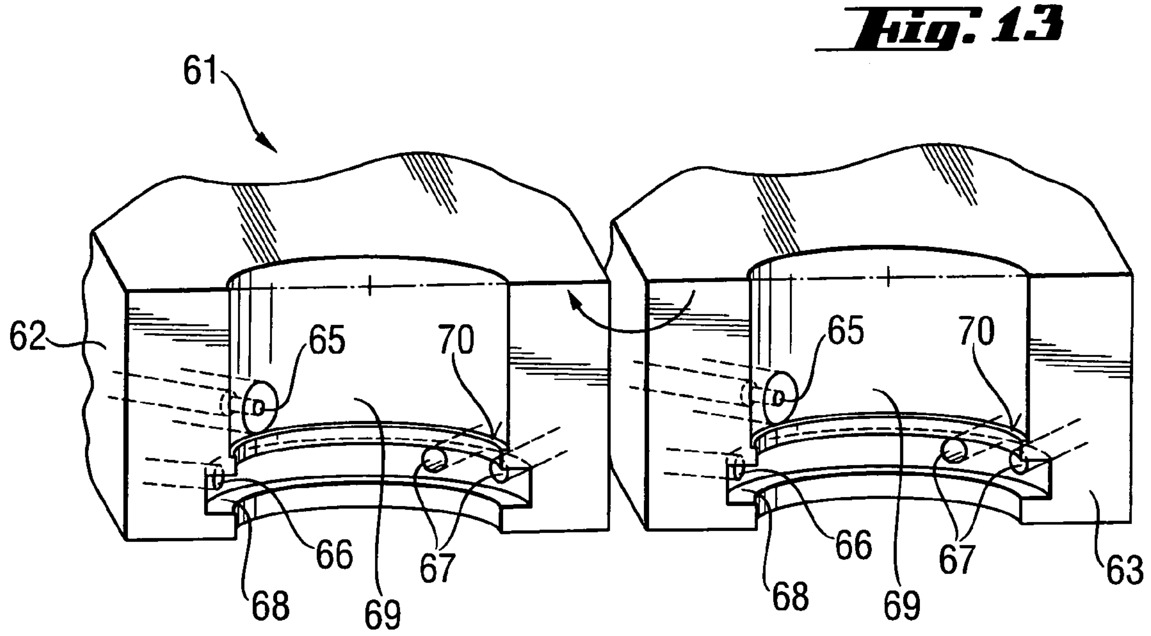
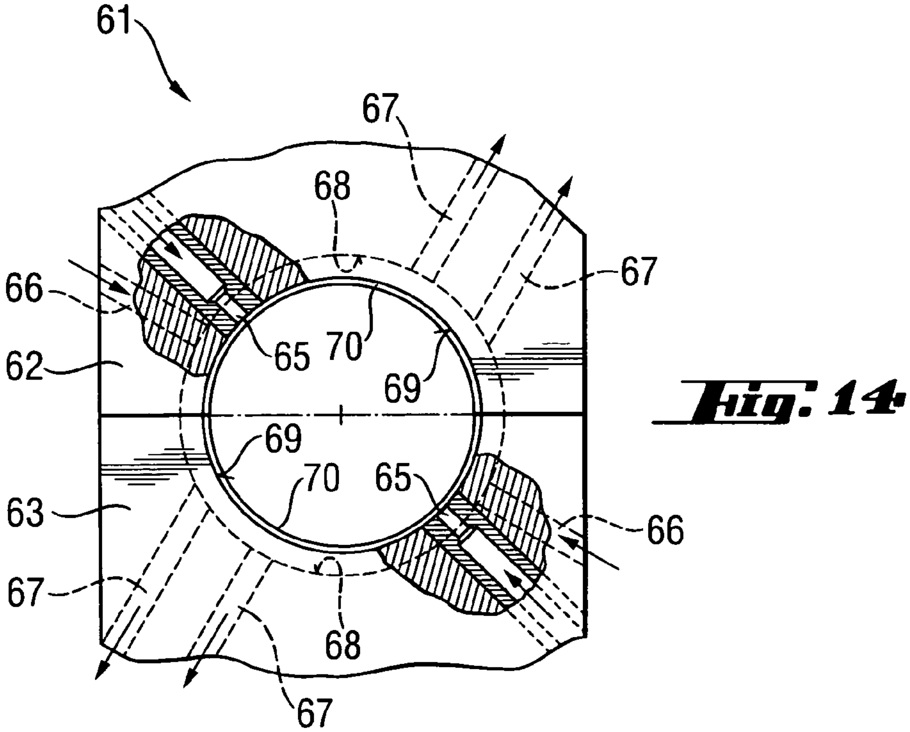
Fig. 14

METHOD OF SEALING A HARD SHELL CAPSULE

This invention relates to a method of and apparatus for sealing capsules and to the capsule formed thereby.

The capsules sealed by the method and apparatus according to the present invention are hard shell, telescopically joined capsules with coaxial partly overlapping body parts. The capsules may be made of gelatin or of other materials whose properties are pharmaceutically acceptable with respect to their chemical and physical properties.

The problem to be solved with respect to such capsules as compared to other dosage forms is the fact that the coaxial body parts must be well sealed in order to avoid leaking of any content to the outside or contamination thereof. Further, tampering with the content of the capsule or the capsule as such should be evident and externally visible for safety proposes. Any technique of sealing the capsules must be suitable for large scale bulk production to reduce manufacturing time and costs and to reduce waste due to imperfections of the product.

BACKGROUND OF THE INVENTION

EP 0 116 743 A1, EP 0 116 744 A1 and EP 0 180 543 A1 disclose methods and devices for sealing such capsules having hard shell coaxial cap and body parts which overlap when telescopically joined. The process employed comprises the steps of dipping batches of the capsules randomly oriented in mesh baskets or oriented with their cap parts upright into a sealing fluid making capillary action within the overlap of the cap and body parts or spraying the sealing fluid or steam thereof onto the seam of the overlap, removing the sealing fluid from the surface of the capsules by an air blower, and applying thermal energy to the capsules while conveying the baskets through a dryer. The documents disclose the use of a wide range of sealing fluids and specific temperatures and modes of application of thermal energy, the disclosure of which is incorporated herein by reference.

EP 1 072 245 A1 also discloses a method for sealing telescopically joined capsules with coaxial body parts through subsequent application of a sealing liquid by the overlapping region at the joint between a cap and a body, the removal of excess sealing liquid, and the application of thermal energy for drying purposes. This document particularly describes the steps of applying a sealing liquid including a solvent uniformly to the external edge of the gap of a capsule to be sealed to form a liquid ring around the circumference of the capsule, removing excess sealing liquid from the exterior of the capsule and drying the capsule by applying thermal energy from outside while gently tumbling and conveying the capsule on a spiral path. Spray nozzles are used for individually applying the sealing liquid. The excess solution is removed from around the capsule by vacuum suction or air jets. The disclosure of this document is incorporated herein by reference, too.

The prior systems for sealing capsules are partly imperfect as regards the quality of the seal and the controllability of the process parameters influencing the quality of the seal.

SUMMARY OF THE INVENTION

The present invention aims at providing an improved method and apparatus for sealing telescopically joined capsules with coaxial partly overlapping body parts, through subsequent application of a sealing fluid and an improvement of the fluid injection phase in order to reach the maximum volume available in the overlap of the body parts while the capsule remains free of residual liquid on its surface.

With respect to this object the present invention provides a method and an apparatus for sealing telecopically joined capsules with coaxial partly overlapping body parts as defined in the appended claims. Sealing clamps are used to seal efficiently hard capsules. Filled or empty capsules are to be oriented before the sealing operation. The sealing clamps hold each capsule in a precise and reproducible upright position. A known quantity of sealing fluid is injected in the overlap of the body parts within a well-defined volume. The excess of sealing fluid is removed from the outside of the capsule shell. Moreover the excess of sealing fluid is removed from the sealing clamp to prevent build-up of sealing fluid. Finally the capsule is released properly.

The use of spray clamps instead of bushings or any other apparatus enables to limit the zone where the sealing fluid is injected to the overlap of the body parts. The design of the sealing clamp limits the location of the sealing fluid to the interior volume of the clamp. The excess of sealing fluid remaining in the clamp is recovered through suction channels.

Using a spray clamp also forces the capsules to be cylindrical which is an advantage when using flexible polymer material to manufacture capsule. Thus the capsule diameter is homogeneous on 360°. The penetration of the sealing liquid by the capillary effect on the whole capsule circumference is favoured. An additional benefit to use a sealing clamp is to guarantee an actual vertical positioning of the capsule with regard to the location of the sealing liquid injection hole.

The spray clamp can be composed of different parts. Each part will participate to the various steps of the process. As an example, the injection of the sealing liquid can happen in one part whilst the excess of sealing fluid can be collected in a second part.

The number of main functional parts that compose the spray clamp can vary from one to six. The number of injection ports can vary from one to eight. The number of suction ports can vary from one to ten. The number of airing can vary from one to six. The positioning of those parts can be spatially arranged to obtain the desired effect. One to three liquid recovery grooves can be added to the design of clamp.

In a preferred embodiment the sealing clamp consists of two parts. These two parts are joined together to open and close the sealing clamp.

The present invention will now be described in more detail, by way of example, with reference to the accompanying drawings in which the following figures show:

DESCRIPTION OF THE DRAWINGS

FIG. 1 first embodiment of a sealing clamp in open position in perspective view, FIG. 2 sealing clamp of FIG. 1, closed, in cross section, FIG. 3 second embodiment of a sealing clamp in open position in perspective view, FIG. 4 sealing clamp of FIG. 3, closed, in cross section, FIG. 5 third embodiment of a sealing clamp in open position in perspective view, FIG. 6 sealing clamp of FIG. 5, closed, in cross section, FIG. 7 forth embodiment of a sealing clamp in open position in perspective view, FIG. 8 sealing clamp of FIG. 7, closed, in cross section, FIG. 9 fifth embodiment of a sealing clamp in open position in perspective view, FIG. 10 sealing clamp of FIG. 9, closed, in cross section, FIG. 11 sixth embodiment of a sealing clamp in open position in perspective view, FIG. 12 sealing clamp of FIG. 11, closed, in cross section, FIG. 13 seventh embodiment of a sealing clamp in open position in perspective view, FIG. 14 sealing clamp of FIG. 13, closed, in cross section.

DETAILED DESCRIPTION

Figure 3:
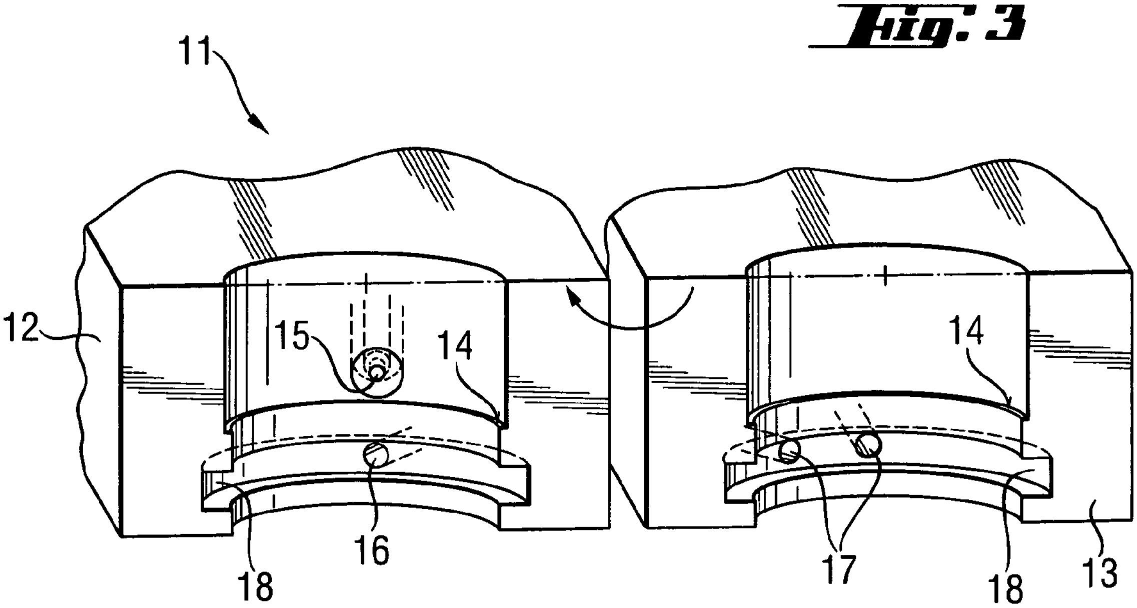

FIGS. 1 and 2 show a first embodiment of a sealing clamp 1 consisting of a first part 2 and a second part 3. In the closed sealing clamp the edge of the cap of a capsule, not shown in the drawings, is precisely located between 0 and 2 mm above the injection port 5. The sealing fluid is injected via an injection port 5 located at 90° from the parting line of the first part 2. Air or any other gas can flow through an airing 6 located at 45° from the parting line of the first part 2 and two suction ports 7 located at 90° and 60° from the parting line of the second part 3. The injection port 5 and the airing 6 are located between 0 and 2 mm below the cap edge while the two suction ports 7 are in the liquid recovery groove 8.

The difference between the first embodiment of a sealing clamp in FIGS. 1 and 2 and the other embodiments shown in FIG. 3 to 14 consists in the number and position of injection ports 5, airings 6, suction ports 7 and liquid recovery grooves 8. The embodiments one to four of FIGS. 1 to 8 enable sealing of 20 to 50% of the maximum surface available. With the sealing clamp of embodiment five a sealed surface of 80% is reached. Use of the sealing clamp of embodiment six gives a large sealed zone of 90 to 100%. With the sealing clamp of embodiment seven the total removal of the excess of sealing fluid from the capsule shell is possible preventing subsequent process defects.

Figure 4:
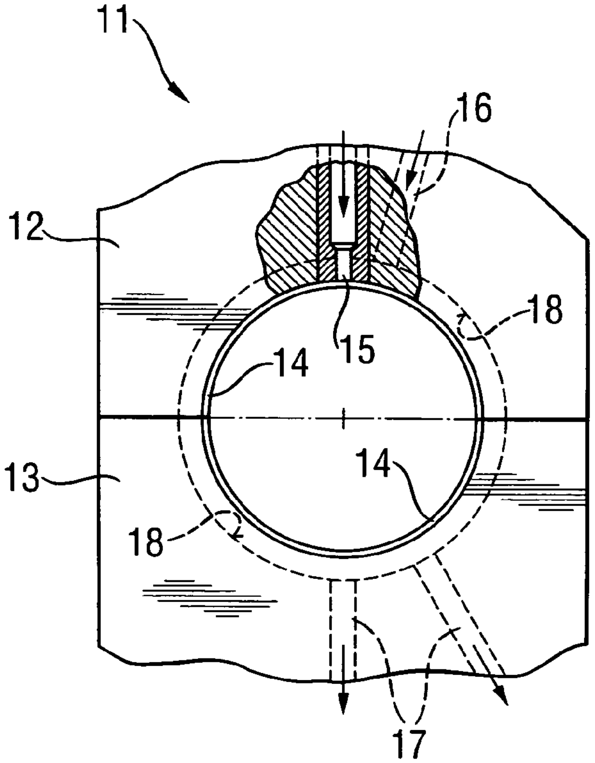

A second embodiment of a sealing clamp 11 shown in FIGS. 3 and 4 consists of a first part 12 and a second part 13. In the closed sealing clamp the edge of the cap of a capsule, not shown in the drawings, is precisely located between 0 and 2 mm above the injection port 15. The sealing fluid is injected via an injection port 15 located at 90° from the parting line of the first part 12. Air or any other gas can flow through an airing 16 located at 75° from the parting line of the first part 12 and two suction ports 17 located at 90° and 60° from the parting line of the second part 13. The injection port 15 is located between 0 and 2 mm below the edge of the cap of a capsule while the airing 16 and the two suction ports 17 are in the liquid recovery groove 18.

A third embodiment of a sealing clamp 21 shown in FIGS. 5 and 6 consists of a first part 22 and a second part 23. In the closed sealing clamp the edge of the cap of a capsule, not shown in the drawings, is at the bottom 29 of the liquid recovery groove 28. The sealing fluid is injected via an injection port 25 located at 90° from the parting line of the first part 22 in the liquid recovery groove 28. Air or any other gas can flow through an airing 26 located at 45° from the parting Is line of the first part 22 and two suction ports 27 located at 90° and 60° from the parting line of the second part 23. The airing 26 and the two suction ports 27 are located in the liquid recovery groove 28.

A forth embodiment of a sealing clamp 31 shown in FIGS. 7 and 8 consists of a first part 32 and a second part 33. In the closed sealing clamp the edge of the cap of a capsule, not shown in the drawings, is at the bottom 34 of the liquid recovery groove 38. The sealing fluid is injected via an injection port 35 located at 90° from the parting line of the first part 32 in the liquid recovery groove 38. Air or any other gas can flow through an airing 36 located at 45° from the parting line of the first part 32 and two suction ports 37 located at 90° and 60° from the parting line of the second part 33. The airing 36 and the two suction ports 37 are located in the liquid recovery groove 38. Additional features are an absorbent layer 39 and a vertical rubber coating 40 at the bottom of the sealing clamp 31.

Figure 9:
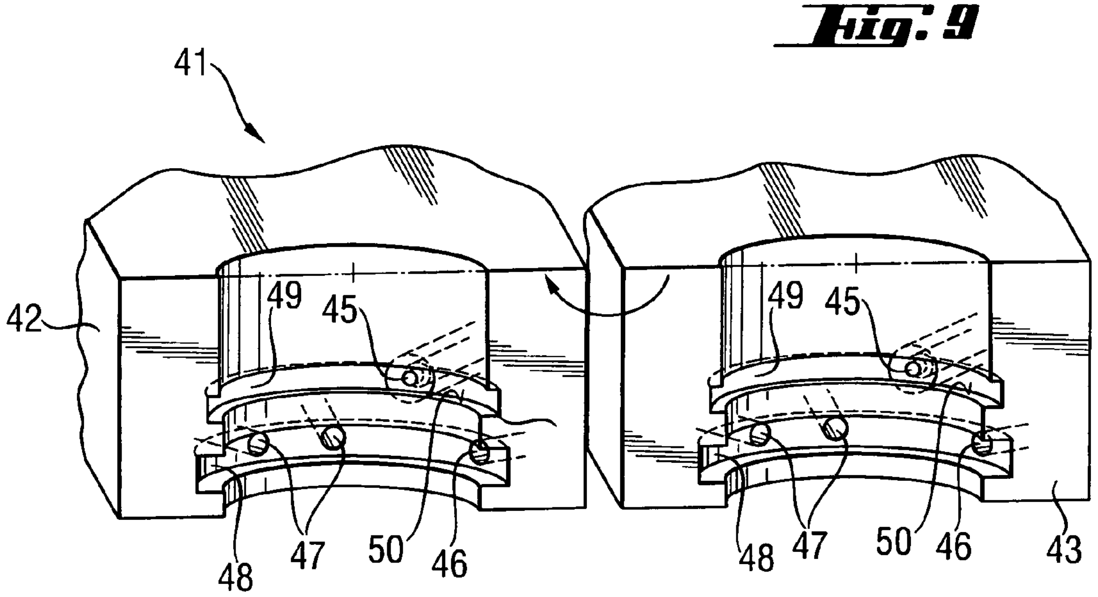
Figure 10:
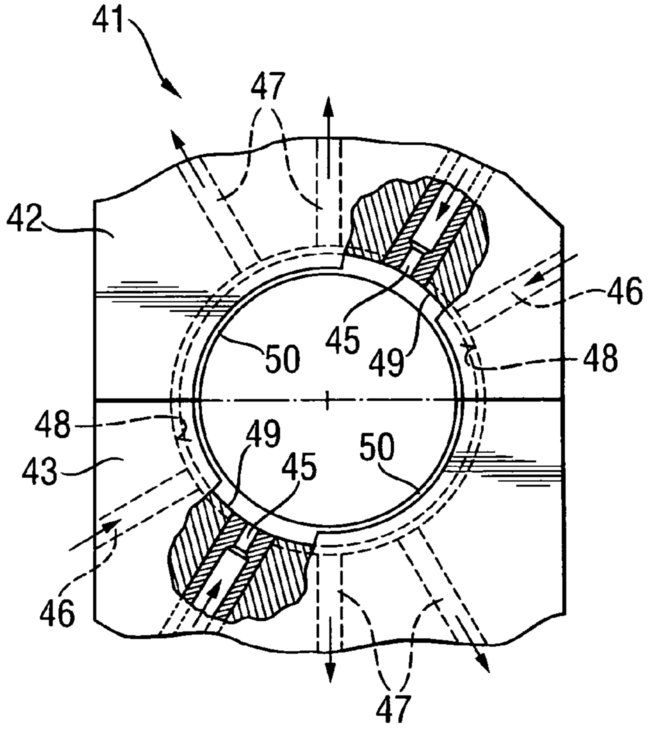

A fifth embodiment of a sealing clamp 41 shown in FIGS. 9 and 10 consists of a first part 42 and a second part 43. In the closed sealing clamp the edge of the cap of a capsule, not shown in the drawings, is at the bottom 50 of a liquid injection groove 49 of the sealing clamp 41. The sealing fluid is injected via two injection ports 45 located at 60° from the parting line of the first part 42 and at 60° from the parting line of the second part 43. Both injection ports 45 enter into a liquid injection groove 49. Air or any other gas can flow through two airings 46 located at 30° from the parting line of the first part 42 and of the second part 43 and through four suction ports 47 located at 90° and 120° from the parting line of the first part 42 and of the second part 43. The airings 46 and the suction ports 47 are located in the liquid recovery groove 48.

A sixth embodiment of a sealing clamp 51 shown in FIGS. 11 and 12 consists of a first part 52 and a second part 53. In the closed sealing clamp the edge of the cap of a capsule, not shown in the drawings, is precisely located between 0 and 2 mm above the injection port 55. The sealing fluid is injected via an injection port 55 located at 60° from the parting line of the first part 52. Air or any other gas can flow through an airing 56 located at 90° from the parting line of the first part 52 and a suction port 57 located at 120° from the parting line of the second part 53. The airing 56 and the suction port 57 are in the liquid recovery groove 58.

A seventh embodiment of a sealing clamp 61 shown in FIGS. 13 and 14 consists of a first part 62 and a second part 63. In the closed sealing clamp the edge of the cap of a capsule, not shown in the drawings, is at the bottom 70 of a liquid injection groove 69 of the sealing clamp 61. The sealing fluid is injected via two injection ports 65 located at 135° from the parting line of the first part 62 and at 135°0 from the parting line of the second part 63. Both injection ports 65 enter into a liquid injection groove 69. Air or any other gas can flow through two airings 66 located at 150° from the parting line of the first part 62 and of the second part 63 and through four suction ports 67 located at 30° and 60° from the parting line of the first part 62 and of the second part 63. The airings 66 and the suction ports 67 are located in the liquid recovery groove 68.

The invention claimed is:

1. A method of sealing a hard shell capsule having coaxial body parts which overlap when telescopically joined, the method comprising the steps of:

using a sealing clamp to clamp and hold the capsule in a precise and upright position, wherein the sealing clamp has at least two parts;

injecting a quantity of sealing fluid in the overlap of the joined body parts;

releasing the capsule; and wherein the capsule is made of materials that are pharmaceutically acceptable with respect to their chemical and physical properties.

2. The method of claim 1, wherein an excess of sealing fluid is removed from the outside of the capsule.

3. The method of claim 2, wherein the excess of sealing fluid is removed from a clamp holding the capsule in the upright position.

4. The method of claim 1, wherein an excess of sealing fluid is removed from a clamp holding the capsule in the upright position.

* * * * *

UNITED STATES PATENT AND TRADEMARK OFFICE

CERTIFICATE OF CORRECTION

PATENT NO. : 7,645,407 B2
APPLICATION NO. : 10/795898
DATED : January 12, 2010
INVENTOR(S) : Cade et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 827 days.

Signed and Sealed this

Sixteenth Day of November, 2010

David J. Kappos

*Director of the United States Patent and Trademark Office*